Aug. 6, 1929.  E. F. BEUGLER  1,723,838
MACHINE FOR MAKING BARRELS
Filed Jan. 31, 1927    11 Sheets-Sheet 1
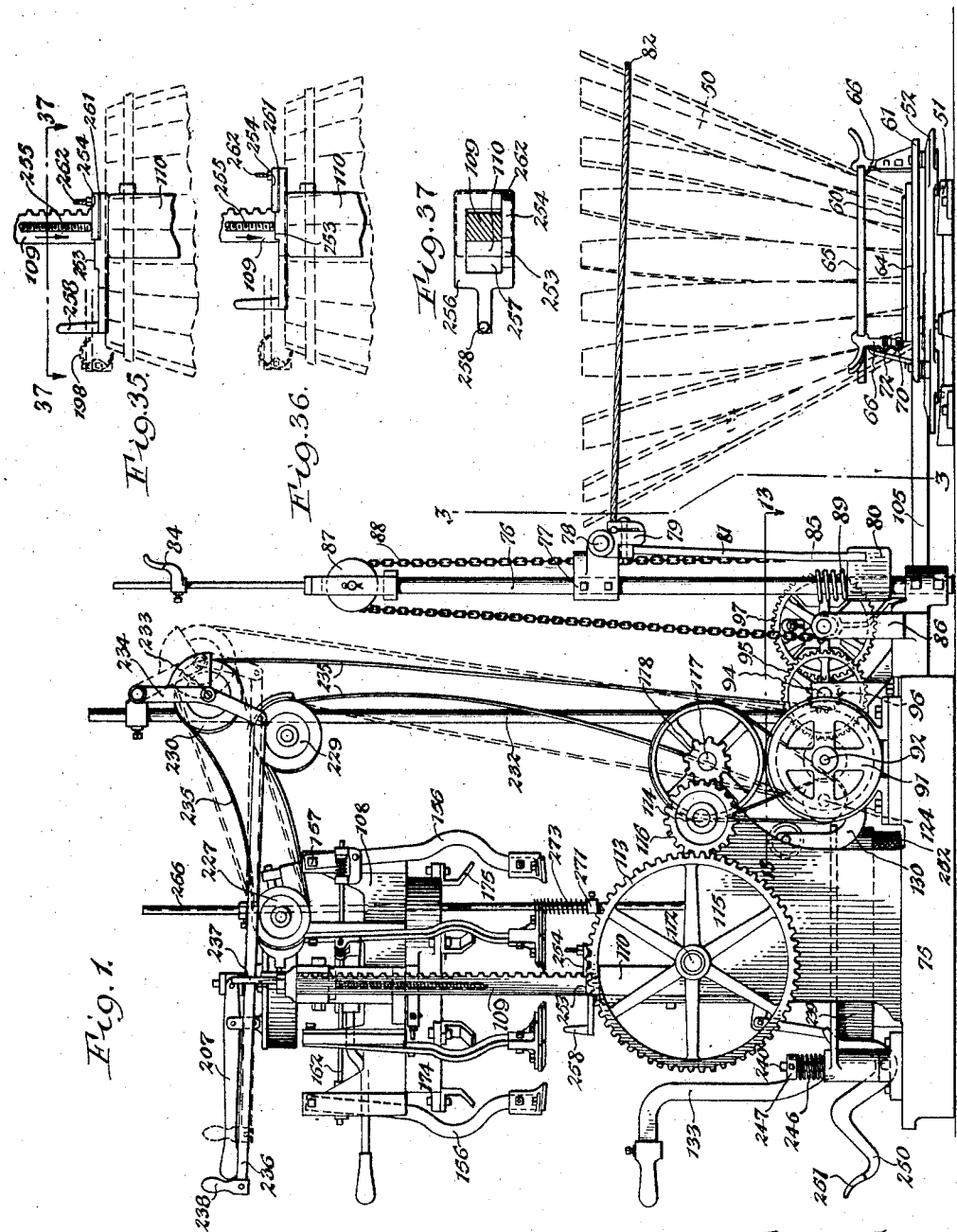

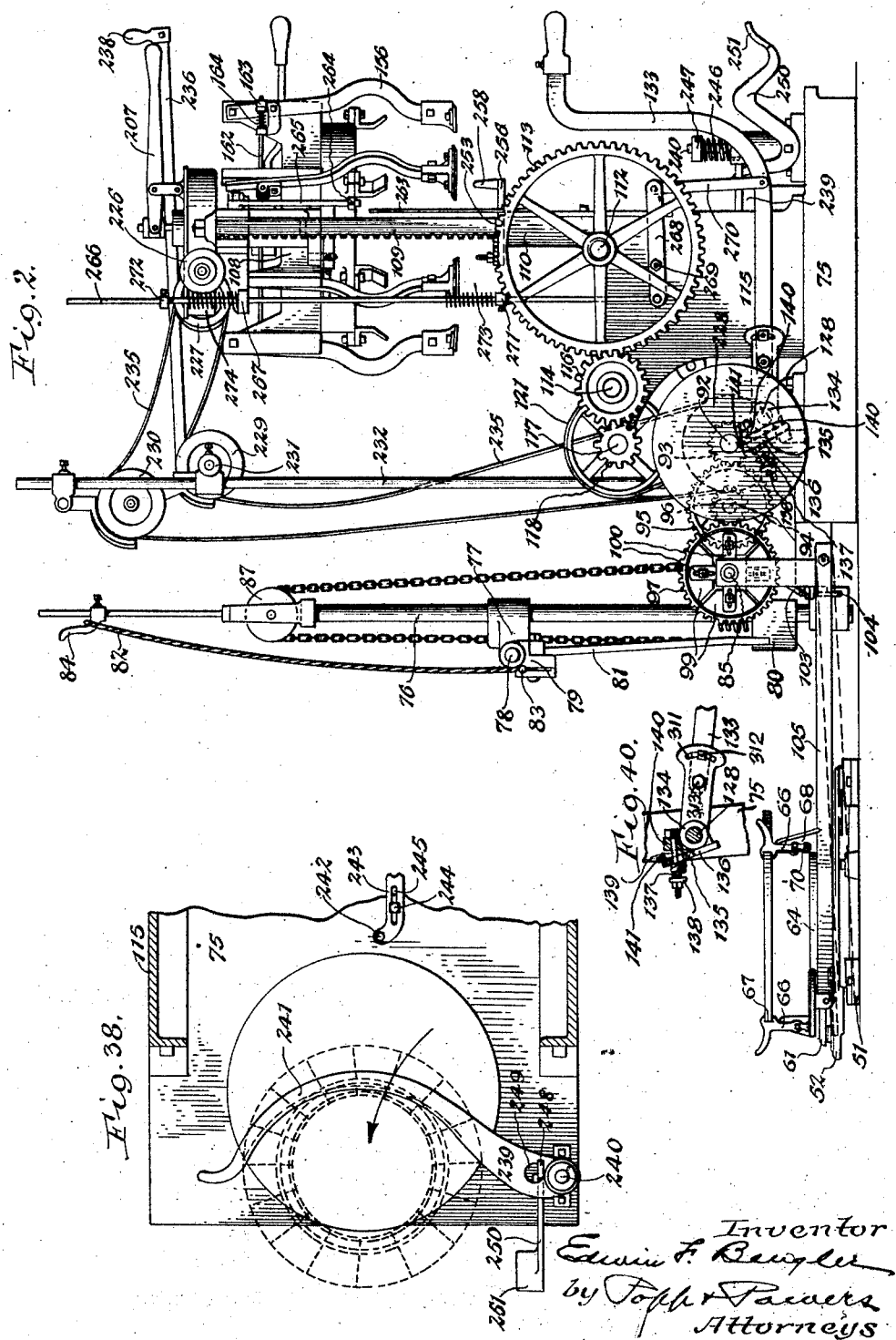

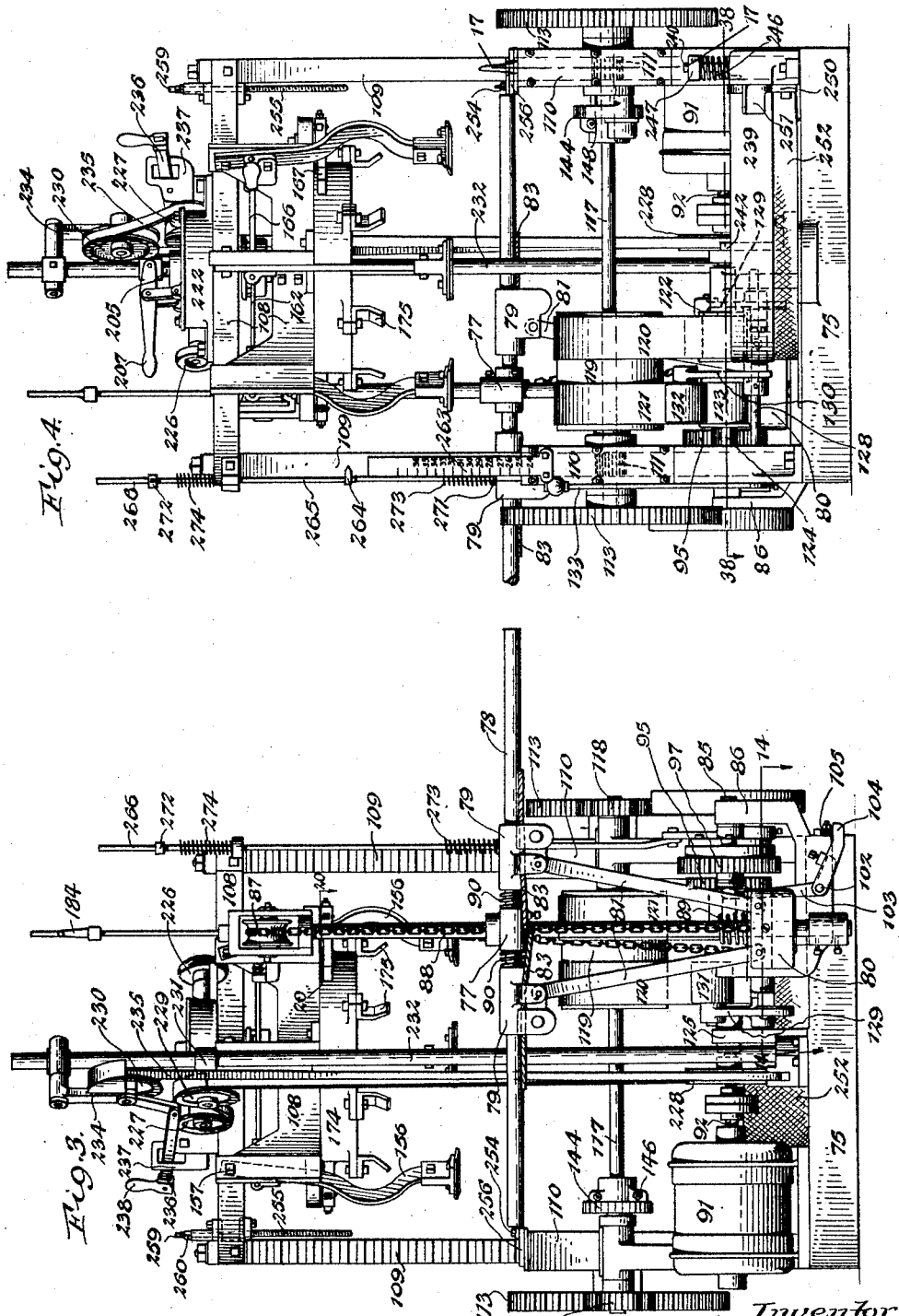

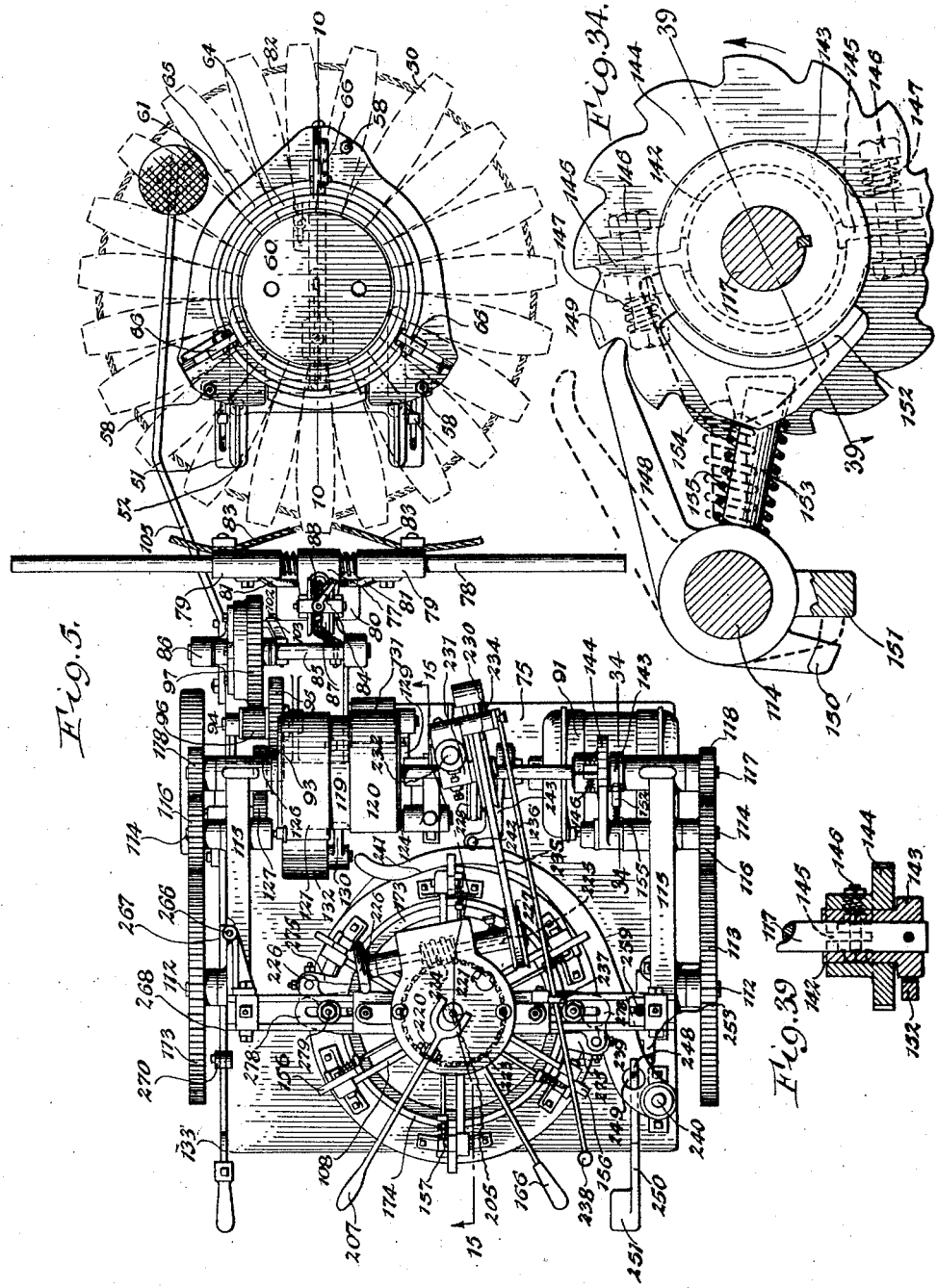

Aug. 6, 1929. E. F. BEUGLER 1,723,838
MACHINE FOR MAKING BARRELS
Filed Jan. 31, 1927 11 Sheets-Sheet 5
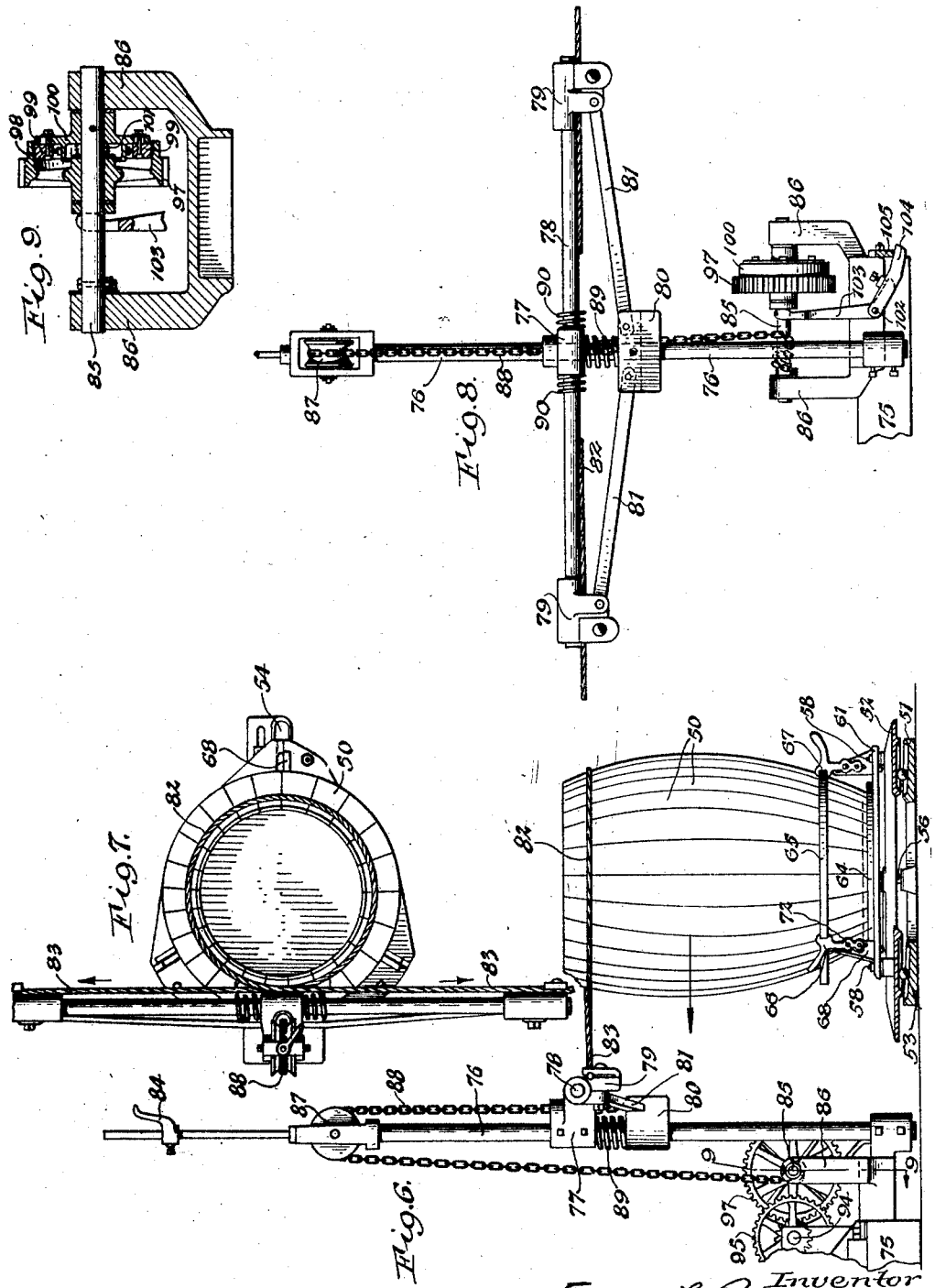

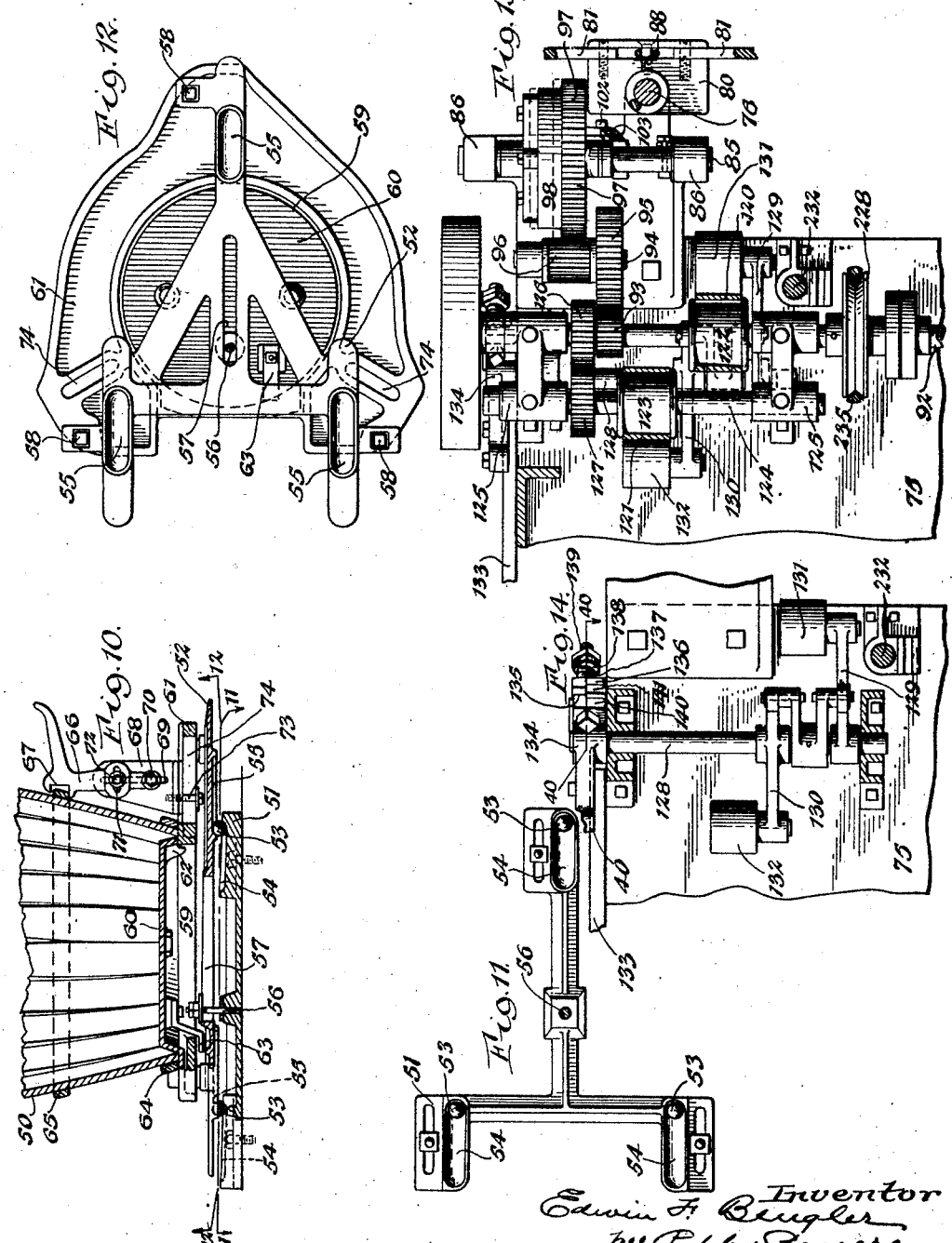

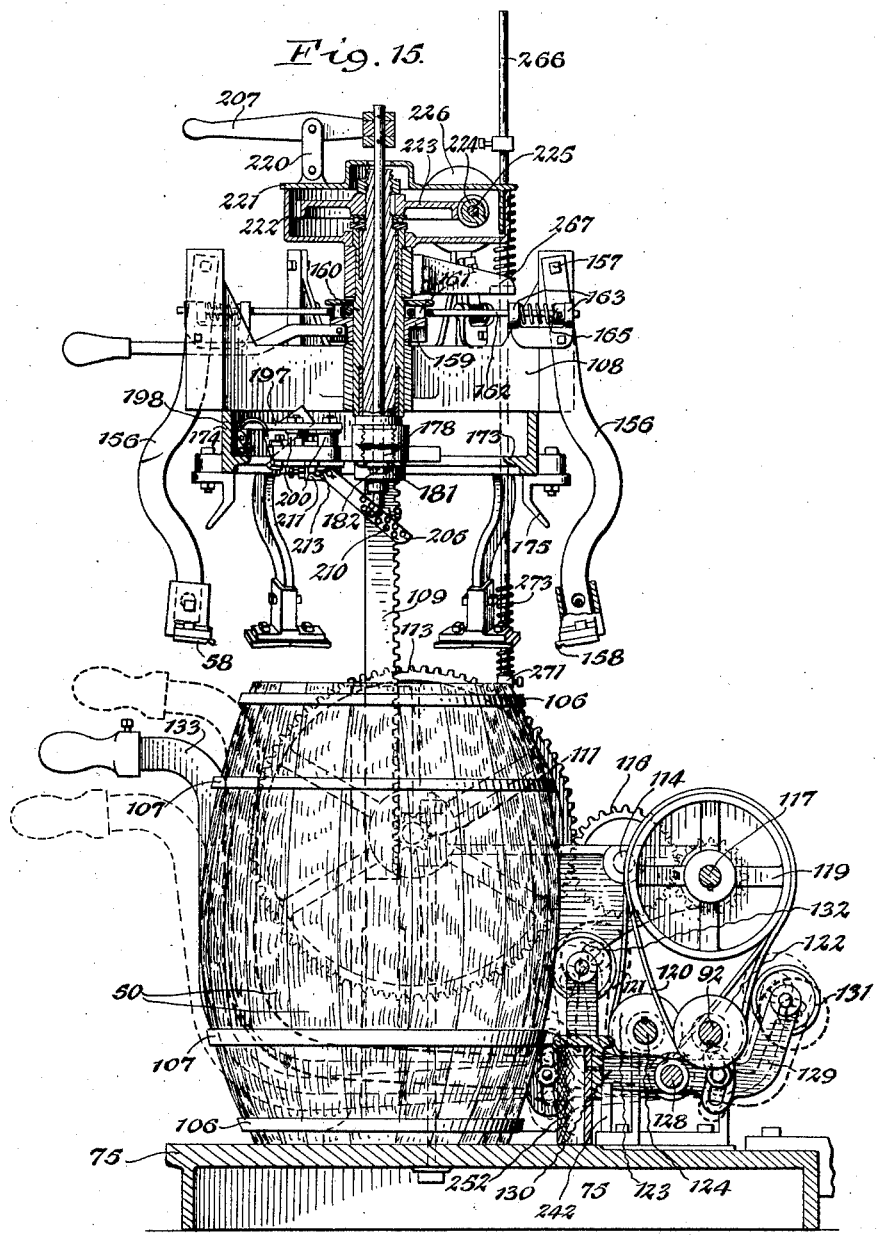

Aug. 6, 1929.  E. F. BEUGLER  1,723,838
MACHINE FOR MAKING BARRELS
Filed Jan. 31, 1927  11 Sheets-Sheet 8
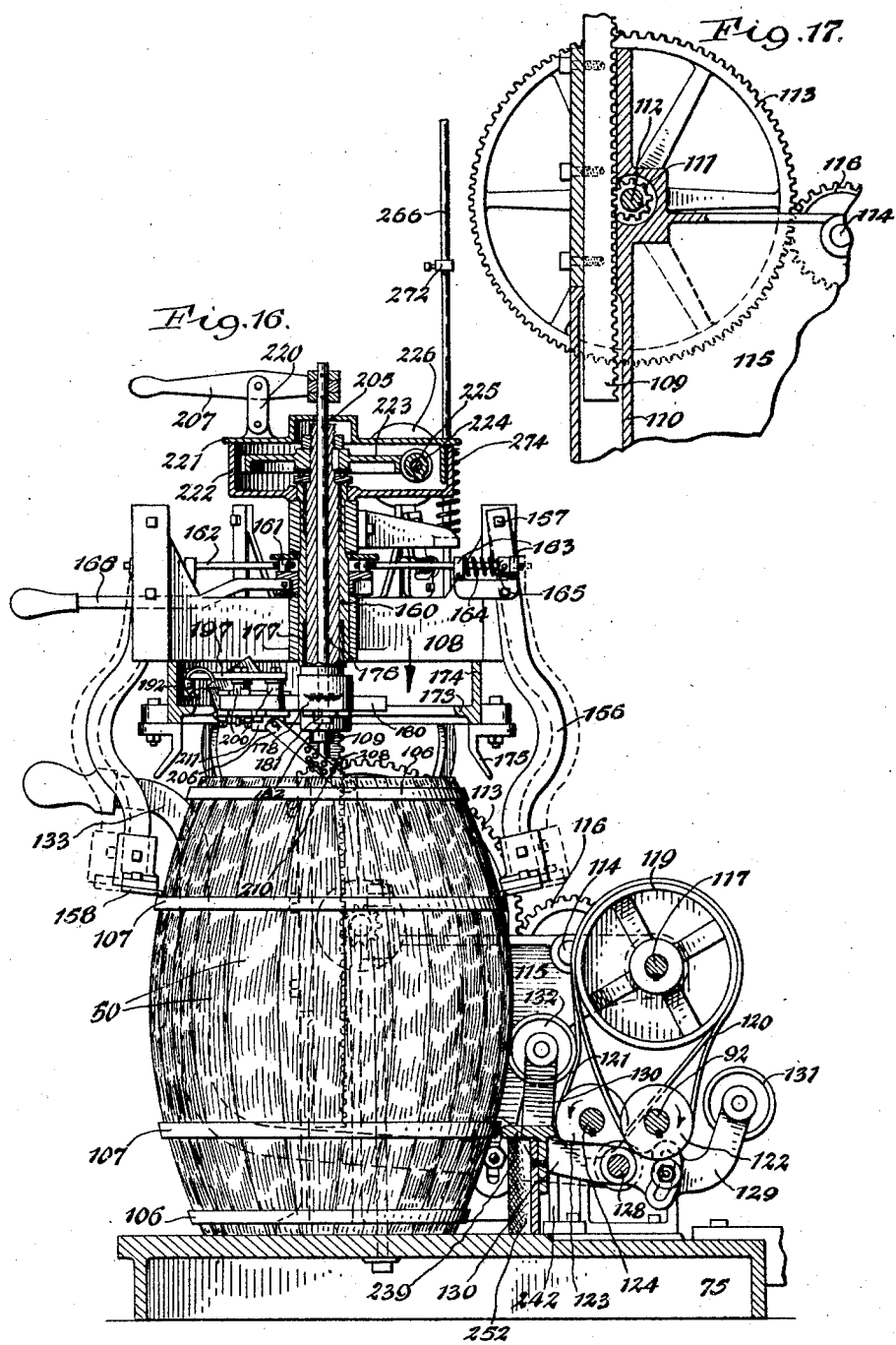

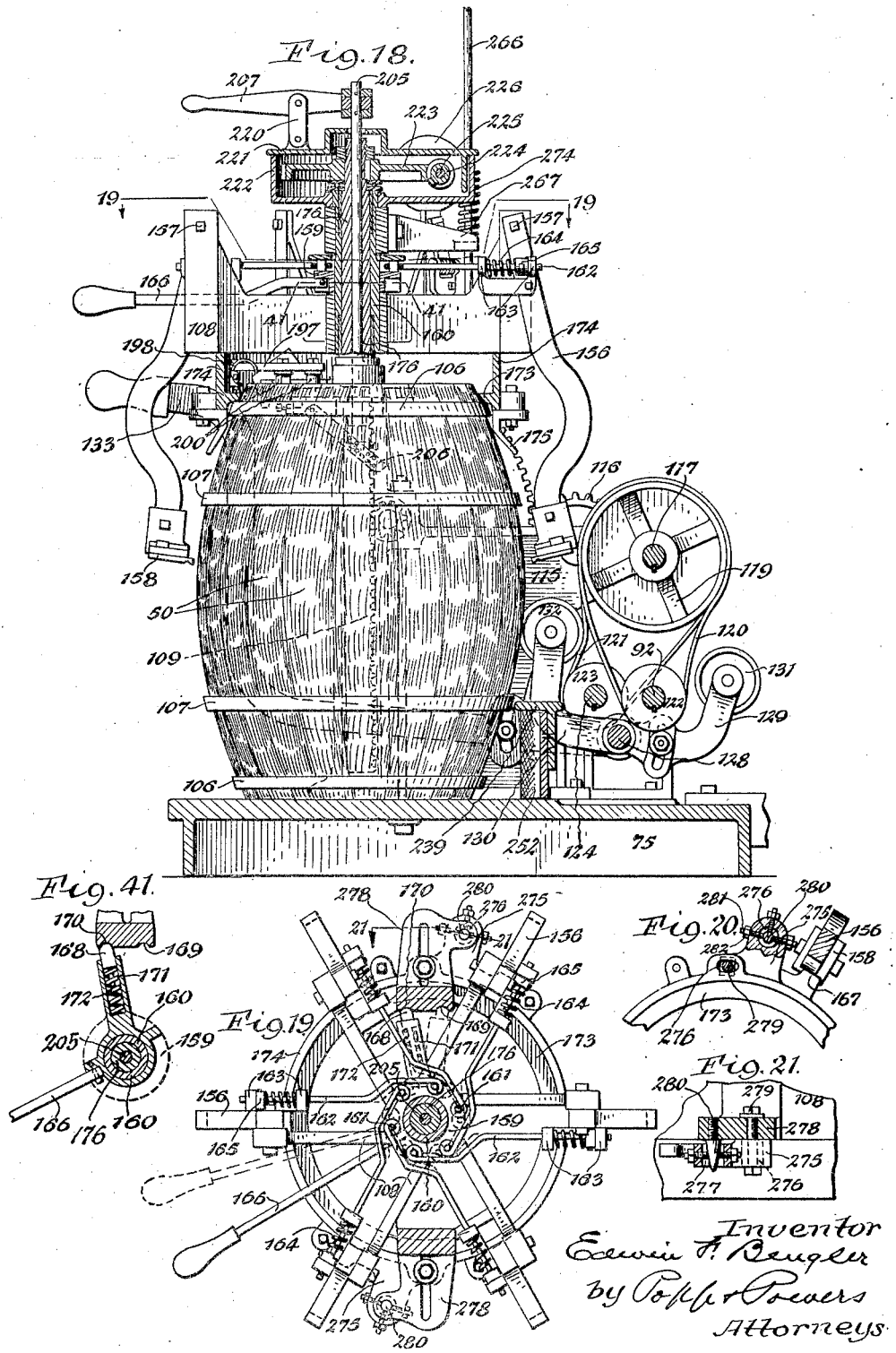

Aug. 6, 1929. E. F. BEUGLER 1,723,838
MACHINE FOR MAKING BARRELS
Filed Jan. 31, 1927 11 Sheets-Sheet 10

Inventor
Edwin F. Beugler
by Popp & Powers
Attorneys

Aug. 6, 1929. E. F. BEUGLER 1,723,838
MACHINE FOR MAKING BARRELS
Filed Jan. 31, 1927 11 Sheets-Sheet 11
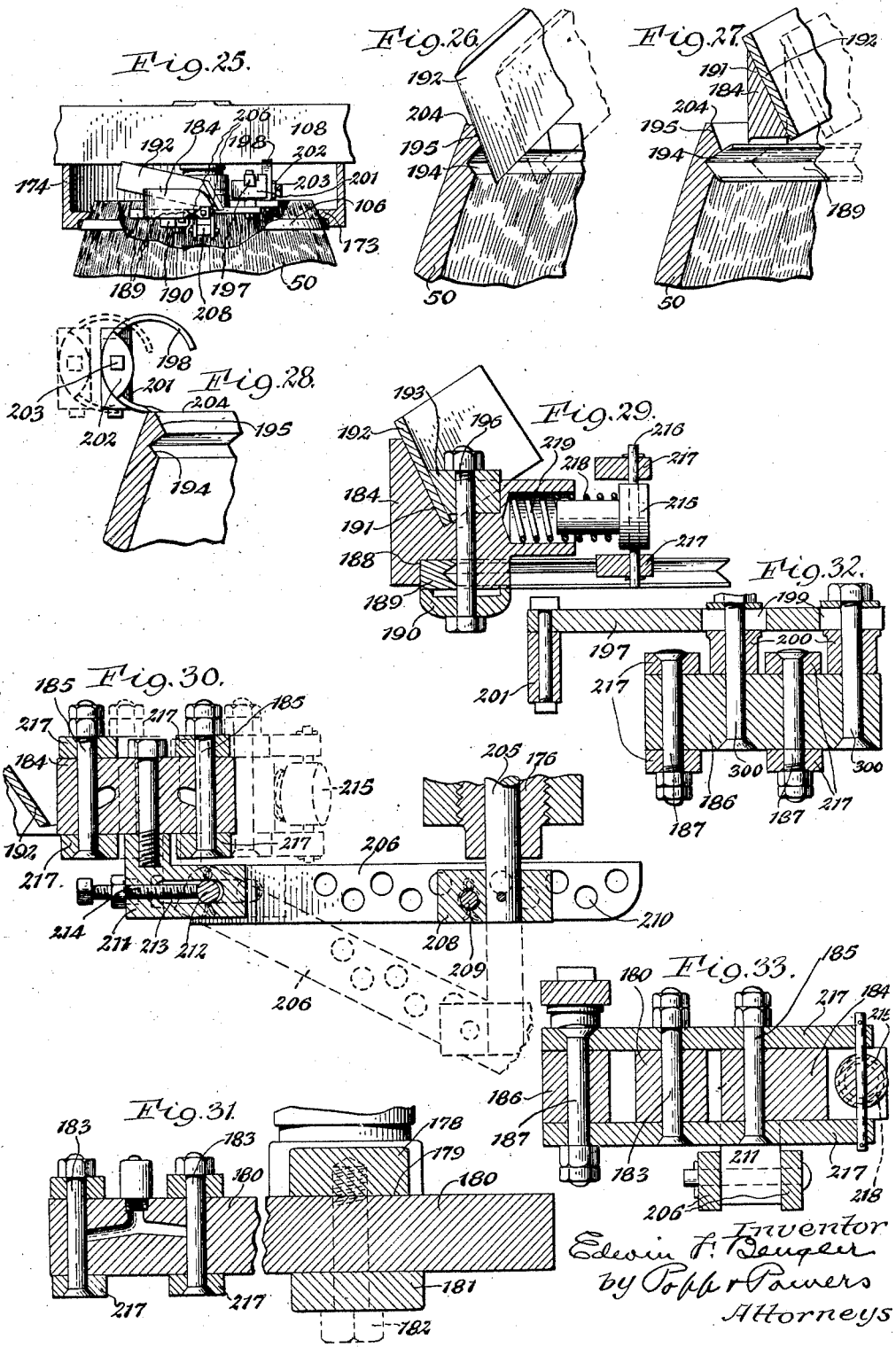

Patented Aug. 6, 1929.

1,723,838

UNITED STATES PATENT OFFICE.

EDWIN F. BEUGLER, OF BUFFALO, NEW YORK, ASSIGNOR TO E. & B. HOLMES MACHINERY CO., OF BUFFALO, NEW YORK, A CORPORATION OF NEW YORK.

MACHINE FOR MAKING BARRELS.

Application filed January 31, 1927. Serial No. 164,676.

This invention relates to a machine for making slack barrels having a body composed of an annular row of longitudinal staves, each of which tapers toward its opposite ends, so that the completed barrel has a bilge midway of its length, and the several staves being held together by surrounding hoops and having their opposite ends trimmed and provided on their inner sides with crozes adapted to receive the edges of the barrel heads, and chamfered faces between said crozes and trimmed ends whereby the heads are guided toward the crozes upon assembling the parts.

Generally speaking, it is the object of this invention to provide improved means for assembling the staves, drawing the same together into the form of a tubular body and loosely applying the truss or temporary end hoops thereto, and driving the permanent bilge hoops on the middle part of the body and the truss or temporary hoops on the ends of the same.

In the accompanying drawings:

Figure 1 is a left side elevation of the barrel making machine embodying my improvements and showing the parts in an inoperative position.

Figure 2 is a right side elevation of the same.

Figure 3 is a vertical transverse section taken on line 3—3 Fig. 1.

Figure 4 is a rear elevation of the machine.

Figure 5 is a top plan view of the machine with part of the windlassing cable omitted.

Figure 6 is a side elevation of the stave contracting or windlassing portion of my machine showing the condition of the barrel body when the windlassing has been partly effected.

Figure 7 is a top plan view of the same showing the windlassing operation completed.

Figure 8 is a fragmentary front elevation of the windlassing mechanism.

Figure 9 is a fragmentary vertical transverse section taken on line 9—9 Fig. 6.

Figure 10 is a fragmentary vertical longitudinal section taken on line 10—10 Fig. 5.

Figures 11 and 12 are horizontal sections taken on lines 11—11, and 12—12, Fig. 10, looking downwardly and upwardly respectively.

Figure 13 is a horizontal section taken on line 13—13 Fig. 1, on an enlarged scale.

Figure 14 is a horizontal section taken on line 14—14 Fig. 3.

Figure 15 is a vertical longitudinal section taken on line 15—15 Fig. 5, showing the parts in their inoperative position.

Figure 16 is a similar view showing the parts in the position in which a bilge hoop has been driven on the barrel body.

Figure 17 is a fragmentary vertical section taken on line 17—17 Fig. 4.

Figure 18 is a similar view showing the bilge hoop driving jaws disengaged from the bilge hoop and the end hoop driving ring in engagement with the end hoop.

Figure 19 is a horizontal section taken on line 19—19 Fig. 18.

Figure 20 is a fragmentary horizontal section taken on line 20—20 Fig. 3, on an enlarged scale.

Figure 21 is a fragmentary vertical section taken on line 21—21 Fig. 19.

Figure 22:
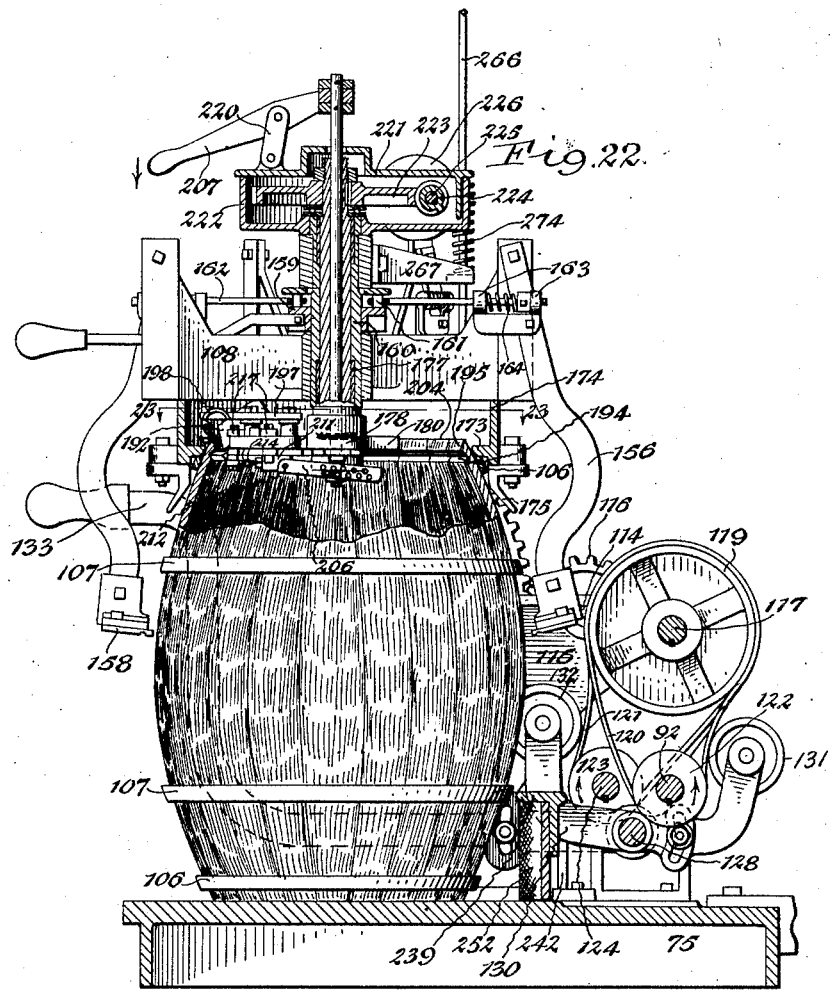

Figure 22 is a section taken on line 15—15 Fig. 5, but showing crozing, chamfering and trimming mechanism in its operative position.

Figure 23:
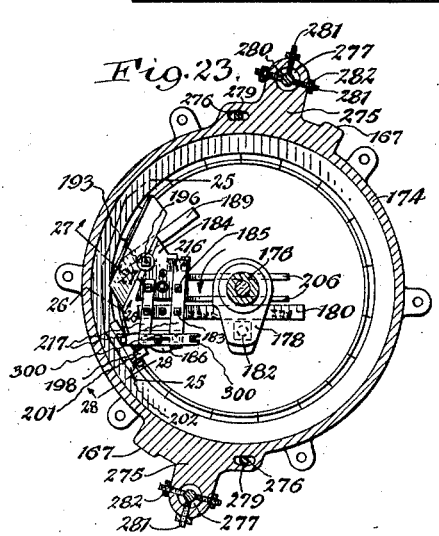
Figure 24:
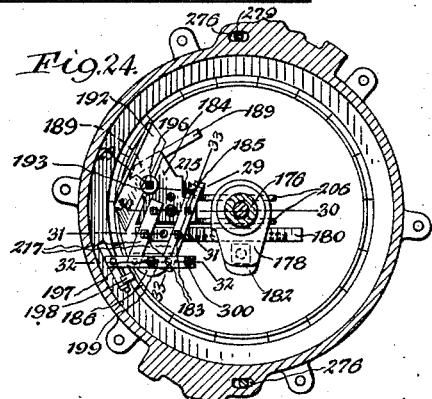

Figures 23 and 24 are horizontal sections taken on line 23—23 Fig. 22, showing the crozing, chamfering and trimming mechanism in its operative and inoperative positions, respectively.

Figures 25, 26, 27 and 28 are fragmentary vertical sections on an enlarged scale, taken on the correspondingly numbered lines in Fig. 23.

Figures 29, 30, 31, 32 and 33 are fragmentary vertical sections, on an enlarged scale, taken on the correspondingly numbered lines in Fig. 24.

Figure 34 is a fragmentary vertical section, on an enlarged scale, taken on line 34—34 Fig. 5.

Figure 35 is a fragmentary side elevation showing one position of the gage mechanism for determining the descent of the vertically movable cross-head and the parts mounted thereon.

Figure 36 is a similar view of the same mechanism showing another position of the same.

Figure 37 is a horizontal section taken on line 37—37 Fig. 35.

Figure 38 is a fragmentary horizontal section taken on line 38—38 Fig. 4.

Figure 39 is a fragmentary horizontal section on a reduced scale taken on line 39—39 Fig. 34.

Figure 40 is a fragmentary vertical section taken on line 40—40 Fig. 14, showing some parts in another position.

Figure 41 is a fragmentary vertical section taken on line 41—41 Fig. 18.

Similar characters of reference indicate corresponding parts in the several figures of the drawings.

In its general organization this barrel making machine comprises means for setting up the staves in the form of a barrel preparatory to drawing them together; windlassing means for drawing the staves of the barrel together into the form of a tubular shell or body; means for driving or trussing the hoops on the body or shell of the barrel after the latter has been heated; means for producing the crozo or chine, and chamfer on the ends of the barrel and trimming off these ends; and means for driving these several mechanisms and controlling the operation of the same.

*Stave setting up mechanism.*

The staves 50 of this barrel shell or body are tapered from their side central parts toward their opposite ends, similar to those now commonly employed in slack cooperage. The mechanism whereby a plurality of such staves are set up preparatory to being drawn together in the form of a shell, is constructed as follows:

The numeral 51 represents a base plate which may be secured to the floor in any suitable manner, and above this base plate is arranged a horizontally movable supporting plate 52 which is so mounted on the base plate 51 as to be capable of horizontal movement toward and from the windlassing mechanism of the machine. In order to permit this movement of the supporting plate 52 to be effected easily and also to cause the same to automatically move constantly by gravity in a direction away from the windlassing machine, a roller bearing is interposed between the base 51 and the plate 52, consisting essentially of a plurality of balls 53 each of which engages its underside with a longitudinal groove 54 on the upper side of the base 51, while the upper side of each of these balls engages with a longitudinal groove 55 on the underside of the supporting plate 52, the bottom of the groove 54 being inclined away from the windlassing apparatus so that the several balls 53 tend to roll by gravity down the inclines 54 and thus carry the supporting plate 52 and the parts carried thereby away from the windlassing mechanism when the setting up mechanism is free.

In addition to the bearing balls 53 the base and supporting frame 52 are guided to move lengthwise by means of a bolt 56 secured to the base and projecting into a longitudinal slot 57, formed at the central part of the supporting frame 52 as best shown in Figs. 10 and 12.

On top the supporting frame 52 is arranged a rack 61 which is removably connected with the supporting frame or plate by means of a plurality of bolts 58. On the central part of this rack the same is provided with an opening 59 and over this opening extends an upwardly tapering or coned centering disk 60. This centering disk is detachably connected with the rack 61 by one or more centering lugs 62 arranged on the underside of the centering disk 60 and engaging with the bore of the opening 59; and a retaining hook 63 arranged on the underside of the disk 60 and projecting downwardly through the opening 59 and laterally underneath the adjacent part of the setting up rack. On its upper side the rack 61 is adapted to support the lower temporary or truss hoop 64 of the shell or body of the barrel, which hoop is heavier than the permanent hoop which will be later substituted for the same. This truss hoop is of such a diameter that when placed on the rack concentrically with the centering disk 60, an annular groove will be formed between this truss hoop and the periphery of the centering disk for the reception of the lower ends of the barrel staves while setting up a plurality of such staves to form the body or shell of the barrel.

While thus setting up a group of barrel staves the same are arranged to form an upwardly flaring cone, and in order to support the several staves in this position a catch hoop 65 is employed which is of larger diameter than the lower end truss hoop, and is arranged at a distance above the latter so as to produce with the centering disk and the lower truss hoop in effect a form which receives the lower parts of the several barrel staves. This catch hoop 65 is supported in this position by a plurality of upwardly projecting supporting dogs 66, each of which is provided at its upper end with an inwardly opening notch or jaw 67 in which the adjacent part of the catch hoop 65 is seated. Each of these supporting dogs is so mounted on the rack 61 as to be capable of vertical and horizontal adjustment with reference to the axis of the barrel shell for the purpose of permitting the same dogs to support catch hoops of different diameters and thus enable barrels of different sizes to be manufactured in the same setting up.

For this purpose a standard 68 is arranged adjacent to each dog 66, which is provided with a vertical slot 69 receiving a clamping bolt 70 at the lower end of the dog 66, and above the bolt 70 the dog 66 is provided with a horizontal slot 71 which receives a bolt 72 mounted on the upper part of the standard 68. By loosening the bolt 70 the dog 66 can be raised and lowered and by loosening the bolt 72 this dog can be moved toward and from the axis of the barrel shell or body. The standard 68 itself can be moved bodily together with the dogs 66 mounted thereon in the direction toward and from the axis of the barrel shell by means of a clamping bolt 73 secured to the lower part of this standard and passing through a radial slot 74 in the adjacent part of the rack 61, as shown in Fig. 10.

*Windlassing mechanism.*

After a plurality of barrel staves have been set up in the forming mechanism so that they assume an upwardly coned or flared position, as shown in Fig. 1, the upper ends of the several staves are drawn together by means of a windlassing mechanism so as to produce a barrel shell or body of substantially tubular form preparatory to applying the temporary and permanent hoops thereon.

This windlassing mechanism, as best shown in Figs. 1, 2, 3, 5, 6, 7, 8, and 9 is preferably constructed as follows, in accordance with my invention:

The numeral 75 represents the base portion of the main frame of the machine, which is arranged in rear of the base 51 of the setting up mechanism. Rising from the front part of the main base 75 which is the side toward the setting up mechanism, is an upright post 76 which is preferably made of round metal for convenience in manufacture. About midway of the height of this post the same has secured thereto a bracket 77 to which is secured the central part of a horizontal guide rod 78. Slidable horizontally on opposite ends of the guide rod 78 are two slides or carriages 79. The guide rod 78 is preferably of cyindrical form for convenience in manufacture and the bore of the slides or carriers 79 engaging with opposite ends of the rod 78 are of corresponding form.

On the lower part of the post 76 is mounted a vertically movable slide 80 which is connected on its opposite sides by means of links 81 with the lower parts of the horizontally movable slide 79. Upon lowering the central slide 80 the side slides 79 will be moved inwardly toward each other, as shown in Fig. 3, and upon raising the central slide 80 the side slides 79 will be spread apart, as shown in Fig. 8. This movement of the side slides 79 is utilized to operate the windlassing rope, cable or line for drawing together the upper ends of the barrel staves.

This windlassing rope is provided with a central loop or turn 82 which is adapted to be placed around the upper ends of the several barrel staves while the opposite ends 83 of this rope are secured to the side slides 79. When the windlassing apparatus is not in use the loop 82 of the same is hung up on a hook 84 which is mounted on the upper part of the post 76, as shown in Fig. 2.

The descent of the central slide 80 and the inner movement of the side slides 79 and loosening the windlassing rope is effected by gravity, but the raising of the central slide and the spreading of the side slides 79 for tightening the loop of the windlassing rope around the barrel staves is effected by power. The means for this purpose shown in the drawings, comprises a horizontal hoisting drum or winding shaft 85 which is journaled in suitable bearings 86 mounted on the adjacent part of the main base 75, a guide pulley 87 mounted on the upper part of the post 76, and a hoisting line 88 having preferably the form of a chain passing with its intermediate or central part over the guide pulley 87, and secured at one end to the central slide 80, while its opposite end is secured to the hoisting drum or winding shaft 85 so that upon turning the latter in one direction this chain 88 will be wound upon the shaft 85, while upon turning the latter in the opposite direction this chain will be unwound therefrom, thereby operating to raise or lower the central slide 80 and tightening or releasing the windlassing rope.

In order to cushion the last portion of the upward movement of the central slide toward the bracket 77, a yielding buffer having preferably the form of a spring 89 is mounted on the post 76 between the upper side of the slide 80 and the underside of the bracket 77, and in order to cushion the last part of the movement of the side slides 79 toward this bracket, buffing means consisting preferably of coil springs 90 are mounted on the rod 78 between the bracket 77 and the slides 79. During the last part of the upward movement of the slide 80 the same engages with the buffer 89 and during the last part of the inward movement of the side slides 79 the same engage the buffers 90, thereby cushioning the end portions of the movement of these parts in these directions and avoiding any undue jarring or noise while operating the machine.

The winding or drum shaft 85 may be operated from any suitable source and manually controlled by various means. As shown in the drawings the winding shaft 85 derives its power from an electric motor 91 which is mounted on the adjacent front part of the main base 75, which motor has its shaft 92 provided with a pinion 93. Between the motor shaft 92 and the winding shaft 85 is arranged an intermediate shaft 94 which latter is journaled on the main frame, as shown in Figs. 1 and 5, and provided with a large gear wheel 95 meshing with the pinion 93 and is also provided with a pinion 96 which meshes with a gear wheel 97 mounted on the winding shaft 85, as shown in Fig. 13. This gear wheel 97 is mounted loosely on the winding shaft 85 and is provided on one side with a conical clutch flange 98 adapted to be engaged by a plurality of clutch shoes 99 mounted on a clutch disk or spider 100, which is secured to the adjacent part of the winding shaft 85, as shown in Fig. 9. The driven gear wheel 97 together with its clutch ring 98 are normally held apart from the clutch shoes 99 by means of a spring 101 so that the gear wheel 97, which turns constantly while the machine is in motion, will not transmit any motion to the winding shaft 85 until the gear wheel 97 and clutch ring 98 are moved lengthwise on the shaft 85 in the direction for engaging the conical bore of the ring 98 with the correspondingly shaped outer ends of the clutch shoes 99. When such engagement takes place power will be transmitted from the motor 91 to the lifting slide 80 and causing the drawing slides 79 to move apart and thereby tighten the loop of the windlassing rope and drawing together the upper ends of the barrel staves, about which this loop has been previously placed by the operator after the staves have been set up.

The movement of the gear wheel 97 and clutch ring 98 for coupling this clutch is effected by means of an intermediate lever pivoted in the adjacent part of the main frame by means of a pin 102 and having an upper arm 103 engaging with the hub of the gear wheel 97, and a lower arm 104 engaging with the underside of a treadle lever 105 pivoted on the adjacent part of the main frame. Upon depressing the treadle lever 105 by means of the foot of the operator, the lower arm 104 will be depressed and its upper arm 103 will be moved in the direction for shifting the clutch ring 98 into engagement with the clutch shoes 99, thereby coupling the motor with the windlassing mechanism and causing the barrel staves to be drawn together. After the barrel has been thus contracted at its upper end and the operator has applied hoops thereto, he releases the downward pressure on the treadle 105 thereby uncoupling the windlassing mechanism from the motor and permitting the windlassing rope to slacken so that the operator can remove the same from the barrel shell or body, preparatory to performing the next operation.

It is to be noted that in the operation of this windlassing apparatus, the initial portion of the tightening effect of the loop of the windlassing rope has the effect of distorting the upper end of the staves so far as a circular arrangement of the same is concerned, as shown by full lines in Fig. 6. As the tightening of the loop of this windlassing rope continues, the shell is drawn backwardly by this rope until the two ends of the same are practically in alignment with each other, at which time the rearward motion of the barrel shell or body ceases and the continued pull upon the windlassing rope serves to complete the contracted effect upon the upper ends of the several barrel staves and finally draws them together into a substantially perfect circular form, as shown in Fig. 7. This rearward motion of the barrel is permitted by reason of the mounting of the setting up form on the movable support, and when the barrel shall have been completed and cable released this movable mounting of the setting up form is free to return by gravity to its forward or outward position preparatory to receiving the next set of staves to be assembled.

Hoop driving or trussing mechanism.

After the upper ends of the staves of the barrel have been drawn together or contracted by the windlassing mechanism so that the shell or body of the barrel is of substantially tubular form, but having a bilge in its center, the operator places another temporary or trussing end hoop 106 on this end of the shell before releasing the windlassing rope and then loosely applies permanent bilge hoops 107 upon opposite ends of the shell or body adjacent to the bilge thereof. The shell having the temporary end hoops and the permanent bilge hoops applied thereto is then placed in an upright position with one end resting on the main base 75 in proper position relative to the hoop trussing or driving mechanism which is constructed as follows:—

Arranged above that part of the main base supporting the barrel to be trussed is a vertically movable cross head 108 which is secured on opposite sides to the upper ends of two vertically movable gear racks 109. The latter are guided at their lower ends in tubular columns 110 which rise from the main base on opposite sides of the barrel body or shell supported on the base. These gear racks together with the parts mounted thereon are caused to rise and fall by a lifting mechanism which comprises gear pinions 111 meshing with the gear racks 109 and mounted on short shafts 112 which are journaled on the upper ends of the columns 110, as best shown in Figs. 3, 5 and 17; gear wheels 113 secured to the shafts 112; intermediate shafts 114 journaled in upright side pieces 115 of the main frame and provided with intermediate or gear wheel pinions 116 meshing with the gear wheels 113 respectively; a transverse equalizing shaft 117 journaled in suitable bearings on the side pieces 115 and provided at opposite ends with gear pinions 118 which mesh respectively with the intermediate gear pinion 116; and means for causing the equalizing shaft 117 to be turned alternately in opposite directions by motion derived from the motor shaft 92.

The mechanism whereby the transverse equalizing shaft 117 is thus caused to turn alternately in opposite directions while the motor shaft turns continuously in the same direction, may be of any approved form, that shown in the drawings—see particularly Figures 1, 2, 3, 4, 5, 13, 14, 15, 16, 18 and 22 being constructed as follows:

The numeral 119 represents a wide belt pulley secured to the transverse shaft 117, and 120 and 121 represent two driving belts passing around opposite ends of this wide driven pulley 119, the opposite turn of the belt 120 passing around a driving pulley 122 on the motor shaft 92, while the opposite turn of the driving belt 121 passes around a driving pulley 123 which is secured to a counter shaft 124 journaled in suitable bearings 125 on the adjacent part of the main frame. The numerals 126 and 127 represent two intermeshing gear wheels or pinions of the same size secured respectively to the motor shaft 92 and counter shaft 124, as best shown in Fig. 13, whereby these shafts are caused to turn in opposite directions. It follows therefore that when the belt 120 is tightened and the belt 121 is loosened, then the gear pinions 111 will be turned in one direction, while upon loosening the belt 120 and tightening the belt 121, said gear wheels 111 will be turned in the opposite direction, but when both of these belts 120, 121 are loose then no motion will be transmitted to the gear pinions 111 and the gear racks and the parts associated therewith will remain at rest.

The tightening and loosening of the belts 120, 121 is preferably effected by means which comprise a rock shaft 128 which is arranged horizontally and transversely in rear of the barrel supporting part of the main base and journaled in bearings which are arranged on the main base and which may be of any suitable character, and tightener arms 129, 130 projecting in opposite directions from the rock shaft 128 and provided with tightening pulleys 131 and 132 respectively, which are adapted to bear against the belts 120 and 121. In the central position of the rock shaft 128, as shown in Fig. 22, both tightener pulleys 131 and 132 are disengaged from the belts 120 and 121 so that no motion is transmitted from the motor shaft 92 to the mechanism which raises and lowers the main cross head 108. Upon rocking the shaft 128 in the direction for engaging the tightener pulley 132 with the belt 121 and still holding the other tightener pulley 131 out of engagement from the belt 120, as shown in Figs. 16 and 18, then motion will be transmitted from the motor shaft 92 to the gear racks 109 so as to move the cross head 108 and the parts mounted thereon downwardly. Upon rocking the shaft 128 in the opposite direction so as to disengage the tightener pulley 132 from its companion belt 121 and engaging the tightener pulley 131 with its companion belt 120, as shown in Fig. 22, then motion will be transmitted from the motor shaft 92 to the gear racks 109 for the purpose of raising the cross head 108 and associated parts mounted thereon.

The turn of the rock shaft 128 in either direction from a central or neutral position is effected by means of a hand lever 133 which latter is so connected with this shaft 128 that the same will normally remain in its central or neutral position and must be forced by manual pressure downwardly if it is desired to lower the main cross head, and to be forced upwardly manually out of its neutral position when it is desired to raise the main cross head. The preferred means for thus holding the reversing lever 133 in its central position consists in mounting its hub on the end of the reversing rock shaft 128 and providing this hub with a flat rear side 135 against which a centering plate 136 is held by means of a spring 137 which is interposed between the rear side of the centering plate 136 and the head 138 of a bolt 139 passing through the centering plate and a lug 140 on the hub of the reversing lever, said centering plate 136 being arranged to bear at one end against a stop 141 on the adjacent part of the main frame and secured to a hub 134 which turns on the shaft 128. The arcuate slot 311 and bolt 312 connection between the sections of the lever 133 which are pivotally connected by a bolt 313 permits of bringing the rear section in the proper position relatively to the stop 141 and the front section in the proper position relative to the shifting lever 268 and also to suit the height of the workmen. After adjustment, the bolts 313 and 312 are tightened to clamp the sections of the lever 133 together and render the same practically one piece when used.

When the reversing lever 133 is in its central position the centering plate 136 bears flatwise against the back of the hub 134 and also against the stop 141 as shown by dotted lines in Fig. 2. Upon lifting the reversing lever 133 for the purpose of causing the main cross head 108 to rise, then the centering plate 136 simply moves away from the stop 141. When however the reversing lever 133 is depressed out of its central or normal position, then the hub 134 turns with the reversing shaft independently of the centering plate 136, which latter at this time is held back by the stop 141 so that the spring 137 is compressed, as shown in Fig.

40, whereby the resilience of this spring will operate to restore the reversing lever 133 to its central or neutral position when released from the hand pressure of the operator.

Owing to the great weight of the cross head 108 and the parts mounted thereon, a brake mechanism is provided which operates to retard the descent of this cross head but permits of raising the same with comparative freedom thereby avoiding undue jarring of the machine and still enabling the same to be operated rapidly. The preferred means for this purpose are best shown in Figs. 3, 4, 5, 34 and 39 and are constructed as follows:

Secured to the transverse equalizing shaft 117 is a brake drum having an inner part 142 of comparatively small diameter and an outer part 143 of comparatively large diameter. Upon the inner part of this drum is mounted a ratchet wheel 144 which frictionally grasps the periphery of the small part 142 of the retarding drum by splitting the hub of this ratchet wheel on opposite sides of its center as shown at 145 and connecting the parts of this hub on opposite sides of each split by means of a clamping bolt 146 and interposing a spring 147 between one end of each of these bolts and the adjacent end of the ratchet wheel hub. On the inner end of the adjacent intermediate shaft 114 is mounted a detent pawl 148 which is adapted to be moved into and out of the path of the teeth 149 of the brake ratchet wheel, the movement of this pawl toward this ratchet wheel being limited by engagement with the teeth thereof, while the movement in the opposite direction thereof is limited by a tail 150 on this pawl engaging with a stop 151 on the adjacent part of the main frame, as indicated by dotted lines in Fig. 34.

The movement of the detent pawl 148 into and out of engagement with the teeth 149 of the retarding mechanism is effected by means of a friction shoe 152 engaging with the periphery of the large part 143 of the brake drum, a shifting pin 153 projecting laterally from the hub of the detent pawl 148 and engaging with a recess 154 in the outer side of the friction shoe 152, and a spring 155 surrounding the shifting pin 153 and bearing at its inner end against the hub of the detent pawl 148 and bearing at its outer end against the friction shoe 152. In the position of the parts shown by full lines in Fig. 34, the detent pawl 148 is lowered into engagement with one of the teeth 149 of the retarding ratchet wheel in which position the latter is held against rotation in the direction of the arrow associated with this figure, whereby the rotation of the transverse shaft 117 is retarded and the cross head 108 and associated parts are prevented from descending too rapidly due to the frictional engagement of the detent ratchet wheel with the small section 142 of the retarding drum, aided to some extent by the frictional resistance produced by the friction shoe 152 against the large section 143 of this brake drum.

When however the transverse operating shaft 117 is turned in a direction opposite to that indicated by the arrow in Fig. 34 for the purpose of lifting the main cross head 108, then the first effect of the rotary motion of the brake drum or sleeve 142, 143 on this shaft is to cause the frictional engagement of the large diameter friction surface 143 to move the shoe 152 upwardly or in a direction opposite to the arrow shown in Fig. 34, whereby this shoe acting through the pin 153 upon the detent pawl 148 causes the latter to be lifted out of engagement from the path of the teeth 149 of the detent ratchet wheel, as shown by dotted lines in Fig. 34, this movement of the shoe 152 and the pawl 148 being limited by engagement of the tail 150 of the pawl with the stop 151. The retarding wheel is now free to turn backwardly with the cross head operating shaft 117 without offering any frictional resistance to such movement other than the slight resistance which is offered by the pressure of the shoe 152 under the resilience of the spring 155 which is inconsiderable, and at the same time the detent pawl is out of the way of the teeth of the ratchet wheel so that the latter are free to turn without producing any creaking noise such as would occur if the ratchet teeth were permitted to run in engagement with the free end of this detent pawl.

A retarding device is therefore provided which operates to check the descent of the main cross head but permits of raising the same without encountering the resistance of this retarding device and without producing any unnecessary noise.

During the descent of the cross head 108 the first part of this motion is utilized to complete the driving of the upper bilge hoop on the shell and the second part of this movement is utilized for completing the driving of the upper end hoop on the same. If it is desired, the bilge hoop may be either a permanent or temporary truss hoop but for the present purposes this distinction can be disregarded as the use of a temporary or permanent hoop is a matter which is governed by choice and by differing conditions.

The mechanism whereby the trussing or driving of the bilge hoop is effected is best shown in Figs. 1, 2, 3, 4, 5, 15, 16, 18, 19 and 22, and is constructed as follows:—

The numeral 156 represents a plurality of upright driving arms which are arranged in an annular row around the cross head 108 and each of which is pivoted thereto at its opposite end by means of a horizontal pivot bolt 157 so that the driving die or jaw 158 at the lower end of each driving arm may be moved toward and from the periphery of the barrel shell or body, and into and out of engagement with the upper edge of the upper bilge hoop. The several driving arms are moved inwardly preparatory to engaging with the bilge hoop during the descent of the main cross head by means of a rotary crank disk 159 journaled to turn about a vertical sleeve 160 mounted vertically in line with the axis of the barrel shell when the same is in its normal operating position on the main base 75.

This crank disk is provided with a plurality of crank pins 161 each of which is connected with the inner end of a shifting rod 162. The outer end of each shifting rod is yieldingly connected with one of the driving arms below the fulcrum of the latter by slidingly engaging the outer part of each rod 162 with its guide lugs 163 on the respective driving arm, and interposing a spring 164 between the inner guide lug 163 and the inner side of a collar 165 on the respective shifting rod, as shown for example in Figs. 18 and 19. In Fig. 19 the crank disk 159 is shown by full lines at one extreme of its turning motion in which the driving arms 156 are expanded or moved outwardly. Upon turning the driving disk 159 by means of a handle 166 into the position shown by dotted lines in Fig. 19, the several crank pins 161 on this disk will cause the shifting rods 162 to draw the driving arms 156 inwardly and engage the periphery of the barrel immediately above the upper bilge hoop thereon.

Such inward movement of the several driving arms is limited by providing the main cross head 108 at one or more points on its periphery with a stop 167 adapted to be engaged with the adjacent driving arm 156 as shown in Figs. 4 and 20. The driving arms are yieldingly held either in the outer inoperative or in the inner operative position by means of a retaining device consisting of a retaining dog 168 adapted to be engaged with one or the other of two notches or seats 169 and 170 arranged circumferentially on the adjacent part of the cross head, said dog being arranged in a tubular arm 171 mounted to turn with the crank disk 159 and held yieldingly in a projected position by means of a spring 172 arranged in the tubular arm 171 and bearing at its opposite end against the retaining dog 168 and the bottom of this tubular arm, as shown in Figs. 19 and 41.

After the operator has turned the crank disk 159 so as to shift the driving dies or jaws into the proper position relative to the periphery of the barrel, the operator works the lever 133 so as to cause the main cross head to descend whereby the dies or jaws of the driving arms are caused to engage the upper edge of the bilge hoops as shown in Fig. 16 and drive the same downwardly on the shell or body of the barrel until it is tight, after which the operator reverses the throw of the crank disk 159 and causes the driving dies or jaws 158 to be disengaged from the bilge hoop. Thereafter the operator again manipulates the controlling lever 133 so as to cause the main cross head to effect the second and final part of its downward movement for the purpose of engaging a driving ring or flange 173 with the upper edge of the upper temporary or truss hoop, as shown in Fig. 18.

This driving ring is formed on the inner lower part of a circular rim 174 which is secured to the underside of the main cross head 108. During the last step of this descending movement of the main cross head, the upper end of the barrel is centered by engagement therewith of a plurality of downwardly diverging centering fingers 175 secured to the lower edge of the supporting rim 174 and adapted to engage with the upper peripheral barrel shell or body, as shown in Fig. 18. During the final portion of the downward movement of the cross head, the driving arms and the driving dies or jaws at their lower ends are disengaged from the adjacent bilge hoop and move idly downwardly beyond this hoop as shown in Fig. 18, so that only the driving ring 173 at this time performs any function.

*Crozing, chamfering and trimming mechanism.*

While the main cross head or carrier 108 is in its lowermost position and the barrel is being held in its centered position by engagement of the driving hoop ring 173 with the upper end hoop, the operator brings into action the mechanism which cuts a croze and chamfer on the upper end of the barrel shell and also trims off this end, which mechanism in its preferred construction, and as best shown in Figs. 1, 2, 3, 4, 5, 15, 16, 18, 19 and 22 to 33, is constructed as follows:

The numeral 176 represents an upright hollow shaft which is journaled in a bearing 177 arranged centrally on the cross head 108 and in axial alignment or concentrically with the axis of the barrel shell which is to be operated upon. At its lower end, this shaft is provided with a laterally projecting arm 178, the underside of which is provided with a notch 179. In this notch is adjustably secured a supporting member 180 having the form of a bar which can be slid tangentially relatively to the axis of the shaft 176 for the purpose of bringing parts which are mounted on the outer end of this bar into position with reference to the barrels of different sizes or diameters.

After adjustment this bar or supporting member 180 is secured in place by means of a clamping plate 181 bearing against the underside of this bar and secured to the arm 178 by means of a clamping bolt 182. Upon the outer end of this supporting bar 180 are mounted two pairs of parallel levers 217 which are adapted to turn about vertical axes so that their movement is in a plane at right angles to the axis of the vertical shaft 176.

In the preferred construction a pair of these levers is arranged on the upper side of the bar 180 and another pair on the underside of the same and the corresponding levers are connected by pivot pins 183 with the supporting bar 180, as best shown in Fig. 31. Between the corresponding arms on one side of these levers is arranged a parallel block 184 which is pivotally connected therewith by means of vertical pivot pins 185 and between the opposite arms of these levers is arranged another parallel block 186 which is pivoted thereto by means of vertical bolts 187 as shown in Fig. 32. These parallel levers 217 and blocks therefore form a double parallelogram which causes these blocks to always remain in a parallel position with reference to each other upon swinging the parallel levers 217 horizontally.

On the underside of the parallel block 184 the same is provided with a seat 188 against which a croze cutter 189 is adapted to be clamped by means of a clamping block 190, as shown in Fig. 29, and on its upper side this parallel block is provided with a seat 191 against which a chamfer cutter 192 is held by means of a clamping block 193, as shown in the same figure. The croze cutter is preferably constructed in the form of a gouge or gouging bit which is of substantially V-shape form in cross section so that upon engaging the inner side of the shell adjacent to the end thereof, a croze 194 will be cut in the shell, as shown in Fig. 27. The cutter or blade 192 is flat and inclined upwardly and also tilted laterally so that when its front cutting edge engages with the inner side of the barrel shell between the croze 194 and the end of the barrel a chamfer 195 will be formed on the shell, as best shown in Fig. 26.

The two clamping blocks 190, 193 are firmly drawn against the outer sides of the cutters 189 and 192 by clamping bolt 196 passing through these blocks and the parallel block 184, upon which these cutters are mounted, as shown in Fig. 29.

Upon the upper side of the other parallel block 186 is mounted the inner end of a cutter supporting bar 197 which latter supports at its outer end a cutter or blade 198 which is adapted to trim or cut off the end of the barrel shell for the purpose of finishing the same, as shown at 204, and establishing the correct length and height thereof.

In order to permit of adjusting this edge trimming knife 198 for adapting the machine to cut barrels of different diameters, the supporting bar 197 is mounted adjustably on the parallel block 186, this being preferably accomplished by means of adjusting bolts 300 passing through the parallel block 186 and through longitudinal slots 199 in the supporting bar 197, spacing sleeves 200 being mounted on the clamping bolts 300 between the upper side of the parallel block 186 and the underside of the supporting bar 197, as shown in Fig. 32, for the purpose of avoiding interference between these several members.

In its preferred construction the end trimmer is made in the form of the letter C in order to permit a cutter of sufficient length to be employed which can be placed in the narrow space available for this purpose and still provide sufficient length of cutter which will permit of advancing the same as its front cutting edge becomes worn and requires repeated sharpening. For this purpose the end trimming cutter is mounted on a cutter block 201 so that the same is capable of adjustment about the axis or center of its curvature, whereby this cutter on being turned about this axis can be adjusted so as to bring its front or cutting edge in the proper position relative to the edge of the barrel and thus permit of compensating for wear and sharpening which is required from time to time. This end cutter is firmly held in its operative position on the cutter block 201 by means of a clamping block 202 and a clamping bolt 203 whereby this cutter block 201 and clamping block 202 are firmly drawn against opposite sides of this end cutter, as shown in Figs. 25 and 28.

While the cross head 108 is being lowered over the upper end of the barrel shell, the parallel levers are turned so that the croze and chamfer cutters are moved inwardly and the edge trimming cutter is moved outwardly, in which position these cutters will clear the edge of the barrel shell, inasmuch as the croze and chamfer cutters are at this time arranged on the inner side of the barrel shell and the trimming cutter on the outer side of the same, as shown in Fig. 24. Upon turning the parallel levers 217 in the opposite direction, the croze and chamfer cutters will be engaged with the inner side of the barrel shell at the upper end thereof and the end trimming knife or cutter 198 will be moved inwardly across the upper end of the barrel shell, whereby these cutters upon being rotated with the shaft 176 will simultaneously operate to produce the croze, chamfer and end trim on the barrel shell.

This movement of the parallel levers 217 for the purpose of shifting the cutters into and out of their operative position may be effected in various ways, but preferably by the means which are shown in the drawings and which comprise a vertically moving shift rod 205 which slides within the bore of the shaft 176, a shifting linkage 206 pivotally connected at its inner end with the lower end of the shifting rod 205 and pivotally connected at its outer end with the parallel block 184, and a hand lever 207 operatively connected with the upper end of the shifting rod 205. When the shifting rod 205 is in its lowered position the linkage 206 operates to draw the parallel block 184 and the cutters 192 and 189 inwardly away from the end of the barrel shell and the end trimmer 198 outwardly away from this shell, but when the shifting rod 205 is raised into the position indicated by full lines in Fig. 30, the parallel levers 217 and blocks are shifted in the direction for moving the croze and chamfer cutters outwardly and the trimming cutter inwardly into the operative positions.

The preferred construction of the linkage 206 comprises two separate links which are arranged on opposite sides of a coupling block 208 which is secured to the lower end of the shifting rod, these links being pivotally connected with this block and also capable of lengthwise adjustment thereon by means of a pin 209 passing through different pairs of corresponding holes 210 arranged at different points in the length of the linkage 206, as shown in Figs. 15, 16, 22 and 30. At their outer ends the links 206 are arranged on opposite sides of the coupling block 211 which is secured to the underside of the parallel block 184, the connection between these links and the coupling block 211 being effected by means of a pivot pin 212 passing horizontally through the links 206 and through a slot 213 in the coupling block 211 and also bearing against an adjusting screw 214 arranged on the block 211, as shown in Fig. 30.

By this means an adjustment of the cutter mechanism with reference to its actuating or shifting mechanism may be effected for the purpose of adapting the cutters for operating on barrel shells of different diameters, a coarse adjustment being first effected by shifting the pivot pin 209 from one set of holes 210 to another and then following this with a fine adjustment which is accomplished by turning the screw 214 in one direction or the other. This screw 214 is constantly held against the pivot pin 212 by a spring return device which also operates to move the cutter blades away from the end of the barrel whenever the downward pull upon the hand lever 207 is released and the shifting rod 205 is permitted to drop into its inoperative position by gravity.

This spring device as best shown in Fig. 29 preferably consists of a swivel 215 which is pivotally mounted by means of a pin 216 on extensions of two of the parallel levers 217 and a spring 218 bearing at one end against this swivel 215, while its opposite end bears against the bottom of the socket 219 formed on the adjacent part of the parallel block 184. When the cutter mechanism is operated to engage the blades with the end of the barrel then the spring 218 is placed under increased tension and when the cutter mechanism is released by dropping of the shifting rod 205 and releasing of the hand lever 207, then the resilience of the spring 218 operates to move the cutter mechanism in the direction for disengaging the blades from the end of the barrel.

The hand lever 207 may be supported in any suitable manner but preferably by means of a link 220 which is mounted on the cover 221 of a casing 222 arranged above the upper end of the shaft 176 and forming in effect a part of the cross head 108 upon which it is mounted, as best shown in Figs. 4, 15, 16, 18 and 22.

While the cutter mechanism is lowered upon the upper end of the barrel and its blades are moved into engagement therewith, a rotary movement is imparted to the shaft 176 so as to cause these blades to cut the croze and chamfer on the barrel shell and trim the end thereof. For this a manually controlled driving mechanism is employed whereby motion is transmitted from the motor shaft 92 to the driving shaft 176 of the cutter mechanism. This driving mechanism in its preferred form and as shown in Figs. 1, 2, 3, 4, 5, 15, 16, 18 and 22 is constructed as follows:

The numeral 223 represents a worm wheel secured to the upper end of the cutter shaft 176 within the housing 222, and the numeral 224 represents a worm meshing with said worm wheel and mounted upon a shaft 225 which is journaled in suitable bearings on the adjacent part of the casing 222. At one end of this worm shaft 225 is provided a hand wheel 226 whereby the same may be turned by hand while adjusting or setting up the cutter mechanism and on its opposite end this shaft is provided with a driven pulley 227 which is adapted to receive power from the motor shaft 92.

The numeral 228 represents a driving pulley mounted on the motor shaft 92, and 229 and 230 represent two intermediate pulleys arranged above the motor shaft 92 and in rear of the main cross head and the cutter shaft 176 journaled thereon. The lower intermediate pulley 229 is journaled on a bearing arrangement 231 mounted on the upper end of a post or rod 232 which rises from the adjacent part of the main base 75, and the upper intermediate pulley has its axle 233 suspended by means of a link 234 on the upper end of this post, as best shown in Figs. 1, 2, 3, and 4. The numeral 235 represents a driving belt passing with its lower turn around the driving pulley 228 and with its upper turn around the driven pulley 227, while the intermediate part of one of its stretches passes over the lower intermediate pulley 229 and the intermediate part of its other stretch passes around the other intermediate pulley 230. The upper intermediate pulley 230 serves as a belt tightener with reference to the belt 235 so that by moving this pulley 230 downwardly into a position in which it leaves this belt slack, as shown in Fig. 2, then no power will be transmitted from the motor shaft 92 to the cutter shaft 176, but when this tightener pulley 230 has swung backwardly and upwardly the driving belt 235 will be tightened, as shown by dotted lines in Fig. 1, and thereby cause motion to be transmitted from the motor 91 to the cutter mechanism. The intermediate tightener pulley 230 is moved into and out of its operative position for tightening or loosening the belt 235 by means of a shipper rod or bar 236 guided midway of its ends in a bracket 237 arranged on the upper side of the cross head 108 and provided at its front end with a handle 238 while its rear end is connected with the lower end of the link 234 which supports the tightener pulley 230. Upon pushing the shipper rod or bar 236 backwardly the belt 235 is tightened for causing the cutter mechanism to operate, and upon moving this bar forwardly this belt is loosened and the cutter mechanism ceases its operation.

After the bilge and end hoop have been driven on one end of the barrel shell and the crozing, chamfering and trimming operations have been performed on the respective end of the same, the barrel shell is reversed end for end and similar operations are performed on the other end of the barrel shell which is now uppermost, while the reversed finished end is now resting on the main base 75 of the machine.

*Barrel shell centering and ejecting mechanism.*

For the purpose of centering the barrel shell relative to the hoop driving and the crozing, chamfering and end trimming mechanism, and also to permit of conveniently ejecting or removing the barrel shell from the supporting base, the following means are provided:

The numeral 239 represents the horizontally swinging arm which is pivoted at one end by means of an upright pivot pin 240 on the base 75 at one side of the place where the barrel shell is supported at its lower end during the operation or working on the upper end of this barrel. The free end of this arm 239 is constructed in the form of the letter C as shown at 241, so that when this arm is in its rearmost position, as shown in Fig. 5, it will serve as a centering device for directing the barrel shell by pushing the latter backwardly into the concave side of the centering arm and thus bringing the shell in axial alignment with the hoop driving and end cutting mechanism.

The rearward movement of the centering and ejecting arm 239 is limited by means of a stop 242 which is adjustably mounted upon the base so that the same centering and ejecting arm can be used for barrel shells of different sizes and diameters, for which purposes the stop 242 is provided with a rearwardly projecting foot 243 which is adjustably connected with the adjacent part of the base by means of a vertical bolt 244 passing through a longitudinal slot 245 in the foot 243, as shown in Fig. 38. The centering and ejecting arm is yieldingly held in its rearmost position by means of a spring 246 surrounding the pivot pin 240 and connected at its opposite ends with the hub of the ejector arm 239 and a collar 247 secured to the upper end of the pivot pin 240, as shown for example in Fig. 1.

The forward movement of the arm 239 for ejecting a barrel from the working position, as shown by dotted lines in Fig. 38, is effected by a treadle lever which is pivoted on the base by means of a horizontal transverse pin so as to swing in a vertical plane and engages its upright rear arm 248 with an opening 249 in the arm 239 while the lower forwardly projecting arm 250 of this treadle lever is provided with a pedal 251 which is adapted to receive the downward pressure of the foot of the operator and thereby actuate the arm 239 for moving the barrel shell forwardly from the base into a position where the same may be taken by the operator and either reversed after one end of the same has been finished or removed from the machine entirely after the operations on both ends of the same have been completed.

For the purpose of keeping clean and free from wood splinters or shavings, that part of the top of the base upon which the lower end of the barrel rests, a sweeper is provided consisting preferably of a flexible strip 252 of rubber fabric or the like which is secured to the lower edge of the arm 239 and projects downwardly therefrom into engagement with the top of the shell supporting area of the base, as shown in Fig. 4, so that this strip removes any shavings or other liter from the top of the base during each shell ejecting operation, and thereby insures an even and smooth surface for the shell to rest upon while subjected to the operations of the hoop driving and cutting mechanism.

*Gage mechanism.*

When the barrel shells are trimmed at opposite ends the length or height of the same must be uniform and to accomplish this a gage device is provided which permits the carrier or cross head to descend a predetermined distance for bringing the cutter mechanism in a definite position relative to the first end of the shell which is to be trimmed and then permits of this cross head to descend a greater distance during its next following descent in order to bring the cutter mechanism mounted thereon in a definite position relative to the opposite end of the barrel shell, thereby compensating for the reduction in the height of the shell which has been removed by the first trimming operation and permit of properly trimming that end of the barrel shell which is less effected and insuring uniform length of the barrel shells.

This gage device in its preferred form is constructed as follows:

The numeral 253 represents a lower stop plate having a comparatively low stop face on its upper side, and 254 represents an upper stop plate having a comparatively high upper stop face, either one or the other of which is adapted to be moved into the path of a tappet 255 for gaging the downward movement of the cross head relative to the main base of the machine. The lower stop plate 253 is preferably formed on a horizontally and longitudinally movable slide 256 which rests on the upper end of one of the gear rack guides 110 and is provided with a longitudinal slot 257 which receives the adjacent gear rack 109, so that this slide is guided in its longitudinal movement, and the opposite ends of the slot 257 serve as stop means for limiting the movement in opposite directions. This movement is effected manually by the hand of the operator who grasps a handle 258 arranged at the front end of the slide 256, as shown in Figs. 1, 2, 4, 35, 36 and 37. The stop 255 is preferably constructed in the form of an upright screw which works in a threaded opening in the adjacent part of the cross head and is provided at its upper end with a square portion 259 whereby the same may be turned with a wrench, a clamping nut 260 being provided on the upper end of this screw stop for engagement with the adjacent threaded part of the cross head for holding this stop screw in position after adjustment.

When effecting the first cutting and trimming operations on one end of the barrel, the slide 256 is moved forwardly so as to bring the upper gage or stop plate 254 into the path of the stop screw 255, as shown in Fig. 35, thereby arresting the downward movement of the cross head in a relatively high position, in which the trimming knife or blade of the cutter mechanism will be located properly for trimming off the first end of the barrel shell.

Preparatory to effecting the second cutting operation on the opposite end of the barrel shell the operator pushes the slide 256 backwardly so as to present the low face of the low stop plate 253 to the stop screw 255, as shown in Fig. 36, and thereby permit the cross head to descend to a lower point before being arrested and thus present the trimming blade or knife of the cutter mechanism in the proper position relative to the last mentioned end of the barrel shell so as to insure trimming off this end at the proper point to secure a definite length of barrel shell.

In order to permit of varying the distance in the height of the high and low gage plates 253 and 254 to suit different conditions or requirements, means are provided for adjusting these two plates relatively to each other, which means in their preferred form on account of their simplicity consist in interposing one or more shims or packing strips 261 between the rear part of the slide 256 and the underside of the upper gage plate 254 and detachably connecting these parts by means of a vertical screw or bolt 262, as shown in Figs. 35 and 36.

By raising and lowering the screw stop 255 the lower or contact end of the same may be adapted for gaging barrels of various heights and lengths within the capacity of the machine.

This gage mechanism is very simple in its operation inasmuch as it merely requires the operator to push the slide 256 either forwardly or backwardly into opposite extremes of its motion for bringing the desired gage plate into its proper position. This gage device is also very strong and durable and not likely to get out of order.

In order to permit of conveniently setting the machine for trimming, crozing and chamfering opposite ends of barrel shells of varying heights or lengths, a vertical scale 263 is mounted on one of the rack guides 110 and this scale is traversed by a vertically movable pointer 264 which is mounted by means of a rod 265 on the cross head 108 so as to move therewith, as shown in Fig. 4. When setting the machine for trimming barrel shells for a predetermined height or length, the cross head is first brought down until its indicator or pointer 264 is opposite the number on the scale 263 which represents the desired height of the barrel shell to be operated upon. The gage slide 256 is then moved forwardly on its support 110 and then the stop screw 255 is adjusted vertically so as to engage the upper or gage surface of the elevated or high stop plate 254.

The machine is now in condition for stopping the descent of the cross head at high and low points for trimming a particular height of barrel shell successively at opposite ends.

*Automatic throw out mechanism.*

Means are provided for automatically stopping the operation of the cross head lowering and raising mechanism in case the operator should fail to shift the hand lever 133 into its neutral position when the cross head has been either lowered or raised the required distance or in case the machine is operated to produce a downward motion of the cross head when no barrel shell is present on the base, thereby avaiding breakage or injury of any material parts of the machine. Preferred means for this purpose are constructed as follows:

The numeral 266 is an upright shipper rod which passes with its intermediate part through a tappet 267 arranged on one side of the cross head 108 and 268 represents an intermediate lever which is pivoted at 269 to swing vertically on the adjacent side piece of the main frame and has its rear arm connected with the lower end of the shipper rod 266 while its front arm is connected by means of a link 270 with the adjacent part of the controlling lever 133 which operates the belt tighteners of the mechanism, which actuate the cross head 108 for raising and lowering the same.

Below the tappet 267 a lower collar 271 is secured to the shipper rod 266 and above this tappet an upper collar 272 is secured to this shipper rod. Between the lower side of the tappet 267 and the lower collar 271, a lower tension spring 273 is mounted on the shipper rod and between the upper side of the tappet 267 and the upper collar 272 and upper tension spring 274 is mounted on the shipper rod. During the normal rising and falling of the cross head within the proper predetermined limits for operating upon the upper end of a barrel shell and clearing the same, the tappet 267 has a range of movement which will knock any pressure either up or downward against the shipper rod 266, thereby leaving the controlling lever 133 free to be moved by the attendant either upwardly or downwardly from its central position and back again to this last mentioned position for causing the cross head to either rise or fall and to be arrested in its movement at the will of the attendant. If, however, the attendant should hold the controlling lever 133 in a depressed position after the cross head has been lowered to such a point where the driving mechanism has performed its operation on the barrel shell and cutter mechanism is in position to properly perform the cutting operations on the respective end of the barrel then the continued downward movement of the cross head will cause the tappet 267 to compress the lower tension spring 273 and exert a downward pressure upon the shipper rod 266, which pressure is transmitted by the lever 268 and link 270 to the controlling lever 133 so as to automatically lift the latter into its neutral position and cause a cross head shifting mechanism to be disengaged from a source of power, and thereby stop the further descent of the cross head and the parts associated therewith.

A similar result will occur when the cross head is raised beyond its normal position, inasmuch as the tappet 267 at such times will cause the upper tension spring 274 to be raised and exert an upward pressure against the upper collar 272, and thereby serve to raise the shipper rod 266 and cause the controlling lever 133 to be automtically moved from a point above its neutral position down to its central or neutral position, and thereby disconnect the cross head from the driving mechanism and arrest the further upward movement of the same. It will therefore be obvious that by means of this automatic throw out, an undue descent and ascent of the cross head is prevented and injury to the machine is thereby avoided.

*Driving and cutter centering mechanism.*

For the purpose of permitting driving heads or rims 174 having driving rings 173 of different diameters to be employed for operating on barrels of different sizes or diameters, and permit of maintaining an accurate co-axial alignment of the driving ring 173 with the axis of the driving shaft 176 of the cutter mechanism and also permit of ready substitution of one driving ring 173 of one diameter for that of another diameter without disturbing the axial alignment, the following means are provided for connecting the head or rim 174 of the end hoop driving ring with the cross head and adjusting these parts relatively to each other.

Projecting laterally from opposite sides of the driving head or rim 174 are two adjusting arms 275 each of which is provided with a circumferential slot 276 and a vertical opening 277. Above each of these arms the cross head 108 is provided with a supporting arm 278 which is connected with the respective adjusting arm 275 by means of a bolt 279 passing through the arm 278 and the slot 276 of the arm 275, as shown in Figs. 19, 20, 21, 23 and 24. Each of the supporting arm 278 is also provided with a downwardly projecting tapering centering pin 280 which enters the opening or eye 277 in the adjacent adjusting arm 275 of the driving head, as shown in Figs. 20, 21, 23.

Mounted in an annular row around each opening 277 on the respective adjusting arm 275 and preferably at different quarters of the circle are three radial adjusting screws 281 which bear against different parts of the periphery of the centering pin 280 and are held in their adjusted position by means of clamping nuts 282. In mounting the driving head on the carrier or crosshead 108, this head is first loosely connected by means of the bolts 279 of the arms 278 with the carrier or cross head. The driving head is then adjusted circumferentially as well as radially in the proper direction for bringing the driving ring 173 into the proper axial alignment with the shaft 176 of the cutter mechanism, which is effected by turning the screws 281 in one direction or the other while the same are in engagement with the centering pin 280.

After the parts have been properly aligned, the bolts 279 are tightened so as to maintain these parts definitely in this relation. If now it is desired to remove the respective driving head 174 from the cross head and replace it by another driving head adapted for a different diameter of barrel, it only is necessary to remove the bolts 279 in order to release the respective driving head without however disturbing the adjustment of the radial bearing screws 281 relative to the centering pin 280. This permits this driving head to be again replaced on the cross head by simply slipping the openings 277 of the adjusting arms 275 upwardly over the centering pins 280 and then applying the fastening bolts 279 and thereby bring the parts together again in axial alignment without the necessity of any re-adjustment, whereby changes in the machine for operating on different diameters of barrels can be effected easily and quickly so that a considerable saving in time and cost of production is effected.

By constructing the centering pins 280 of downwardly tapering form it is possible to easily remove the driving head from the cross head, inasmuch as the adjusting screws 281 will readily disengage themselves from the centering pins 280, due to the tapering form of the latter, and re-engagement of the same is equally easy. This however would not be possible if the centering pins 280 were of cylindrical form, inasmuch as the adjusting screws 281 would have a tendency to bind on the centering pins 280 both when assembling the parts or dis-membering the same in case the driving head is tilted slightly out of its level position during this operation.

I claim as my invention:

1. A barrel making machine comprising a carrier movable toward and from the barrel shell, means for operating on said shell mounted on said carrier, actuating means for operating said carrier, and means for controlling said actuating means comprising a rock lever having its hub provided with a stop face, a centering plate engaging said stop face, spring means for holding said centering plate against said stop face, and a stationary stop engaged by said centering plate.

2. A barrel making machine comprising a carrier movable toward and from the barrel shell, means for operating on said shell mounted on said carrier, actuating means for operating said carrier and means for controlling said actuating means comprising a rock lever having its hub provided with a stop face, a centering plate engaging said stop face, a coupling bolt loosely connecting said hub and centering plate, a spring interposed between said bolt and centering plate and operating to hold the latter yieldingly in engagement with said stop face, and a stationary stop which is engaged by said centering plate.

3. A barrel making machine comprising a base adapted to support a barrel shell to be operated upon, a carrier movable vertically toward and from the upper end of said shell, upright gear racks arranged on opposite sides of the barrel shell and secured at their upper ends to said carrier and guided at their lower ends on said base, means mounted on said carrier for operating on said shell, means mounted on said base for raising and lowering said carrier and associated parts including a rotary shaft, and retarding means for checking the descent of said carrier but permitting comparatively free upward movement of the same.

4. A barrel making machine comprising a base adapted to support a barrel shell to be operated upon, a carrier movable vertically toward and from the upper end of said shell, upright gear racks arranged on opposite sides of the barrel shell and secured at their upper ends to said carrier and guided at their lower ends on said base, means mounted on said carrier for operating on said shell, means mounted on said base for raising and lowering said carrier and associated parts including a rotary shaft, and retarding means for checking the descent of said carrier but permitting comparatively free upward movement of the same, comprising a brake drum secured to said shaft, friction members engaging said brake drum and means for holding said friction members against movement during downward movement of the carrier and releasing said friction members during upward movement of said carrier.

5. A barrel making machine comprising a base adapted to support a barrel shell to be operated upon, a carrier movable vertically toward and from the upper end of said shell, upright gear racks arranged on opposite sides of the barrel shell and secured at their upper ends to said carrier and guided at their lower ends on said base, means mounted on said carrier for operating on said shell, means mounted on said base for raising and lowering said carrier and associated parts including a rotary shaft, and retarding means for checking the descent of said carrier but permitting comparatively free upward movement of the same, comprising a brake drum, a retarding wheel having a split hub engaging one part of said drum and provided with a toothed ratchet rim, a detent pawl movable into and out of engagement from the teeth of said rim, and a shifting shoe engaging another part of said drum and operatively connected with said pawl and adapted to move the same into and out of engagement with said toothed rim.

6. A barrel making machine comprising a base adapted to support a barrel shell to be operated upon, a carrier movable vertically toward and from the upper end of said shell, upright gear racks arranged on opposite sides of the barrel shell and secured at their upper ends to said carrier and guided at their lower ends on said base, means mounted on said carrier for operating on said shell, means mounted on said base for raising and lowering said carrier and associated parts including a rotary shaft, and retarding means for checking the descent of said carrier but permitting comparatively free upward movement of the same, comprising a brake drum, a retarding wheel having a split hub engaging one part of said drum and provided with a toothed ratchet rim, a detent pawl movable into and out of engagement from the teeth of said rim, a shifting shoe frictionally engaging another part of said drum and provided with a recess, a shifting pin arranged on said pawl and engaging with said recess, and a spring interposed between said pawl and shoe.

7. A barrel making machine comprising a base adapted to support a barrel shell to be operated upon, a carrier movable vertically toward and from the upper end of said shell, upright gear racks arranged on opposite sides of the barrel shell and secured at their upper ends to said carrier and guided at their lower ends on said base, means mounted on said carrier for operating on said shell, means mounted on said base for raising and lowering said carrier and associated parts including a rotary shaft, and retarding means for checking the descent of said carrier but permitting comparatively free upward movement of the same, comprising a brake drum, a retarding wheel having a split hub engaging one part of said drum and provided with a toothed ratchet rim, a detent pawl movable into and out of engagement from the teeth of said rim, a shifting shoe frictionally engaging another part of said drum and provided with a recess, a shifting pin arranged on said pawl and engaging with said recess, a spring interposed between said pawl and shoe, and a tail arranged on said pawl and adapted to engage a stop for limiting the movement of the pawl away from said toothed rim.

8. A barrel making machine comprising a base adapted to support a barrel shell to be operated upon, a carrier movable vertically toward and from the upper end of said shell, upright gear racks arranged on opposite sides of the barrel shell and secured at their upper ends to said carrier and guided at their lower ends on said base, means mounted on said carrier for operating on said shell, means mounted on said base for raising and lowering said carrier and associated parts including a rotary shaft, and retarding means for checking the descent of said carrier but permitting comparatively free upward movement of the same, comprising a brake drum, a retarding wheel having a split hub engaging one part of said drum and provided with a toothed ratchet rim, a detent pawl movable into and out of engagement from the teeth of said rim, a shifting shoe frictionally engaging another part of said drum and provided with a recess, a shifting pin arranged on said pawl and engaging with said recess, a spring interposed between said pawl and shoe, a tail arranged on said pawl and adapted to engage a stop for limiting the movement of the pawl away from said toothed rim, bolts connecting the split parts of said hub, and springs interposed between the ends of said bolts and said split parts of said hub for pressing the latter against said drum.

9. A barrel making machine comprising a base adapted to support a barrel shell to be operated upon and provided on opposite sides of the shell receiving base with upright guides, vertically movable gear racks sliding in said guides, a cross head arranged above said base and connected at its opposite ends with the upper ends of said racks, means mounted on said cross head for operating on said shell, and gearing mounted on said base co-operating with said gear racks for raising and lowering said cross head.

10. A barrel making machine comprising a base adapted to support a barrel shell to be operated upon and provided on opposite sides of the shell receiving base with upright guides, vertically movable gear racks sliding in said guides, a cross head arranged above said base and connected at its opposite ends with the upper ends of said racks, means mounted on said cross head for operating on said shell, gearing mounted on said base co-operating with said gear racks for raising and lowering said cross head, comprising lifting pinions meshing with said rack and pivoted on said guide, gear wheels connected with said lifting pinions, intermediate pinions meshing with said gear wheels, and a transverse shaft provided at opposite ends with driving pinions meshing with said intermediate pinions.

11. A barrel making machine comprising a base adapted to support a barrel shell to be operated upon and provided on opposite sides of the shell receiving base with upright guides, vertically movable gear racks sliding in said guides, a cross head arranged above said base and connected at its opposite ends with the upper ends of said racks, means mounted on said cross head for operating on said shell, gearing mounted on said base co-operating with said gear racks for raising and lowering said cross head, and means for operating said gearing comprising a driving shaft, a counter shaft, gearing for causing said driving and counter shafts to turn in opposite directions, driving pulleys mounted on said driving and counter shafts, a driven pulley operatively connected with said gearing, two belts one passing around said driven pulley and one of said driving pulleys and the other passing around said driven pulley and the other driving pulley, and means for tightening said belts alternately.

12. A barrel making machine comprising a base adapted to support a barrel shell to be operated upon and provided on opposite sides of the shell receiving base with upright guides, vertically movable gear racks sliding in said guides, a cross head arranged above said base and connected at its opposite ends with the upper ends of said racks, means mounted on said cross head for operating on said shell, gearing mounted on said base co-operating with said gear racks for raising and lowering said cross head, and means for operating said gearing comprising a driving shaft, a counter shaft, gearing for causing said driving and counter shafts to turn in opposite directions, driving pulleys mounted on said driving and counter shafts, a driven pulley operatively connected with said gearing, two belts one passing around said driven pulley and one of said driving pulleys and the other passing around said driven pulley and the other driving pulley, and means for tightening said belts alternately, comprising a rock shaft provided with arms projecting in opposite directions therefrom, tightener pulleys mounted on said arms and adapted to engage said belts, respectively, and a hand lever connected with said shaft.

13. A barrel making machine comprising a base for supporting a barrel to be trimmed at the ends, a carrier movable vertically toward and from the base, cutting means mounted on the carrier and adapted to trim the ends of the shell, and a movable stop device for limiting the downward movement of said carrier and provided with two stop faces arranged at different elevations, and a tappet mounted on said carrier and adapted to engage one or the other of said stop faces for arresting the descent of the carrier accordingly.

14. A barrel making machine comprising a base for supporting a barrel to be trimmed at the ends, a carrier movable vertically toward and from the base, cutting means mounted on the carrier and adapted to trim the ends of the shell, and a movable stop device for limiting the downward movement of said carrier and provided with two stop faces arranged at different elevations, and a tappet mounted on said carrier and adapted to engage one or the other of said stop faces for arresting the descent of the carrier accordingly, said stop device consisting of a horizontally slidable plate having two faces arranged at different heights, and a tappet screw adjustable vertically on said carrier and adapted to engage one or the other of said faces.

15. A barrel making machine comprising a base for supporting a barrel to be trimmed at the ends, a carrier movable vertically toward and from the base, cutting means mounted on the carrier and adapted to trim the ends of the shell, and a movable stop device for limiting the downward movement of said carrier and provided with two stop faces arranged at different elevations, and a tappet mounted on said carrier and adapted to engage one or the other of said stop faces for arresting the descent of the carrier accordingly, said stop device consisting of a horizontally slidable lower plate having a low stop face, an upper plate adjustably connected with the lower plate and having a high stop face and a tappet arranged on said carrier and adapted to engage one or the other of said stop faces.

16. A barrel making machine comprising a base for supporting a barrel to be trimmed at the ends, a carrier movable vertically toward and from the base, cutting means mounted on the carrier and adapted to trim the ends of the shell, and a movable stop device for limiting the downward movement of said carrier and provided with two stop faces arranged at different elevations, and a tappet mounted on said carrier and adapted to engage one or the other of said stop faces for arresting the descent of the carrier accordingly, said base having upright guides, said carrier having upright supporting members sliding in said guides, and a stop device having a slot which receives one of said supporting members.

17. A barrel making machine comprising a base adapted to support a barrel shell to be operated upon, a carrier arranged above the base and movable toward and from the upper end of said shell, shifting means for raising and lowering said carrier, means for controlling said shifting means comprising a vertically movable lever which is in its central position when the carrier is at rest and which is depressed when the carrier descends and elevated when the carrier rises, and means interposed between the carrier and said controlling lever for moving the same into its central position when the carrier descends or ascends beyond its normal travel.

18. A barrel making machine comprising a base adapted to support a barrel shell to be operated upon, a carrier arranged above the base and movable toward and from the upper end of said shell, shifting means for raising and lowering said carrier, means for controlling said shifting means comprising a vertically movable lever which is in its central position when the carrier is at rest and which is depressed when the carrier descends and elevated when the carrier rises, and means interposed between the carrier and said controlling lever for moving the same into its central position when the carrier descends or ascends beyond its normal travel, comprising an upright shipper rod provided on its upper and lower parts with upper and lower collars, a rock lever connected at one end with said shipper rod and at its opposite end with said controlling lever, a tappet arranged on said carrier and movable along said shipper rod, and upper and lower springs mounted on said shipper rod between the upper and lower sides of said tappet and said upper and lower collars, respectively.

19. A barrel making machine comprising a base having a platform adapted to support a barrel shell to be operated upon, an arm mounted on said base and adapted to engage with said shell and to move across said platform, and a sweeper mounted on said arm and adapted to engage the surface of said platform.

In testimony whereof I affix my signature.

EDWIN F. BEUGLER.